(12) United States Patent
Yoshizumi et al.

(10) Patent No.: US 12,109,845 B2
(45) Date of Patent: Oct. 8, 2024

(54) PNEUMATIC TIRE

(71) Applicant: SUMITOMO RUBBER INDUSTRIES, LTD., Hyogo (JP)

(72) Inventors: Takuma Yoshizumi, Hyogo (JP); Hiroki Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 845 days.

(21) Appl. No.: 16/642,516

(22) PCT Filed: Aug. 31, 2018

(86) PCT No.: PCT/JP2018/032463
§ 371 (c)(1),
(2) Date: Feb. 27, 2020

(87) PCT Pub. No.: WO2019/054213
PCT Pub. Date: Mar. 21, 2019

(65) Prior Publication Data
US 2020/0189331 A1 Jun. 18, 2020

(30) Foreign Application Priority Data
Sep. 12, 2017 (JP) ................... 2017-175254

(51) Int. Cl.
*B60C 19/00* (2006.01)
*B60C 23/00* (2006.01)
*B60C 23/04* (2006.01)

(52) U.S. Cl.
CPC .......... *B60C 19/00* (2013.01); *B60C 23/0433* (2013.01); *B60C 2019/004* (2013.01)

(58) Field of Classification Search
CPC . B60C 15/06; B60C 15/0603; B60C 15/0607; B60C 2015/0614; B60C 2015/0617; B60C 23/0433
See application file for complete search history.

(56) References Cited

U.S. PATENT DOCUMENTS 4,285,381 A * 8/1981 Furukawa ............... C08L 21/00
524/509
2008/0289736 A1 11/2008 Adamson et al.
(Continued)

FOREIGN PATENT DOCUMENTS

JP 2006-168473 6/2006
JP 2007-230261 9/2007
(Continued)

OTHER PUBLICATIONS

Extended European Search Report, EPO, Application No. 18857129.3, issued Mar. 26, 2021.
(Continued)

*Primary Examiner* — Justin R Fischer
(74) *Attorney, Agent, or Firm* — Greenblum & Bernstein, P.L.C.

(57) ABSTRACT

Provided is a tire structure technology with which sufficient reading performance can be maintained even when a tire having an electronic component provided therein is caused to travel at high speed with severe handling. A pneumatic tire in which an electronic component is provided farther outward in a tire axial direction than a carcass, and in which the $E^*(1)_{50°\ C.}$ at 50° C. and $E^*(1)_{150°\ C.}$ at 150° C. of a first rubber member, and the $E^*(2)_{50°\ C.}$ at 50° C. and $E^*(2)_{150°\ C.}$ at 150° C. of a second rubber member, satisfy the following formula, where the first rubber member is a tire rubber member that has the greatest E* at 50° C. among tire rubber members positioned inward from the electronic component in the tire axial direction, and the second rubber member is a tire rubber member that has the greatest E* at 50° C. among tire rubber members positioned outward from the electronic component in the tire axial direction.

$(E^*(1)_{50°\ C.}/E^*(2)_{50°\ C.})-(E^*(1)_{150°\ C.}/E^*(2)_{150°\ C.})\geq 1.0$

9 Claims, 2 Drawing Sheets

(56) References Cited

U.S. PATENT DOCUMENTS

| | | |
|---|---|---|
| 2009/0015415 A1 | 1/2009 | Uehara et al. |
| 2011/0175778 A1 | 7/2011 | Myatt |
| 2012/0291936 A1 | 11/2012 | Lionetti et al. |
| 2016/0303921 A1 | 10/2016 | Miklic et al. |
| 2017/0225524 A1 | 8/2017 | Tamura |

FOREIGN PATENT DOCUMENTS

| | | | |
|---|---|---|---|
| JP | 2007-230261 A | | 9/2007 |
| JP | 2008-265750 | | 11/2008 |
| JP | 2008-265750 A | | 11/2008 |
| JP | 2012-240680 | | 12/2012 |
| JP | 2016-037235 | | 3/2016 |
| JP | 2016-037236 | | 3/2016 |
| JP | 2016/539047 | | 12/2016 |
| JP | 2016-539047 A | | 12/2016 |
| WO | WO 03/105509 | * | 12/2003 |
| WO | 2007/100111 | | 9/2007 |
| WO | WO 2016/060851 | * | 4/2016 |

OTHER PUBLICATIONS

International Search Report, International Searching Authority, Application No. PCT/JP2018/032463, dated Nov. 20, 2018, English translation.

International Preliminary Report on Patentability, International Searching Authority, Application No. PCT/JP2018/032463, dated Mar. 17, 2020, English translation.

* cited by examiner

PNEUMATIC TIRE

TECHNICAL FIELD

The present invention relates to a pneumatic tire in which an electronic component such as RFID is provided inside.

BACKGROUND ART

In recent years, in order to monitor various data such as the internal pressure, temperature and rotational speed of pneumatic tires (hereinafter, also simply referred to as "tires") to improve safety, maintainability, etc. while the vehicle is traveling, it has been proposed that an electronic component such as transponder for RFID) (Radio Frequency Identification) (hereinafter, also simply referred to as "RFID)") for recording the data is to be provided to a tire.

The transponder is a small, lightweight electronic component consisting of a semiconductor chip with a transmitter/receiver circuit, a control circuit, a memory, etc., and an antenna. As the transponder, battery-less one is often used which can transmit various data as response radio waves when it receives an inquiry radio wave, which is used as electrical energy.

As a method of providing such an electronic component to a tire, a method has been proposed in which the electronic component is adhered to the surface of the tire after vulcanization by adhesion or the like (for example, Patent Document 1). However, when this method is adopted, there is a problem that the electronic component easily falls-off while traveling on the road surface, although there is little risk that the electronic component is destroyed.

Then, in order to prevent falling-off of electronic component, a method has been proposed in which the electronic component is integrated with a tire by vulcanization adhesion accompanying vulcanization molding after molding the green tire while embedding the electronic component inside (for example, Patent Document 2).

PRIOR ART DOCUMENTS

Patent Documents

[Patent document 1] JP2006-168473 A
[Patent document 2] JP2008-265750 A

SUMMARY OF INVENTION

Problem to be Solved by the Invention

However, when a method is adopted in which an electronic component is provided inside of the unvulcanized tire, for example in the bead portion etc. from the viewpoint of securing the durability in particular, and then integrated with the tire, there is a risk that the electronic component is damaged and deformed and sufficient reading performance cannot be obtained, when traveling the tire under high speed and severe handling, although there is no risk that the electronic component falls-off.

Therefore, an object of the present invention is to provide a manufacturing technology for tire which can suppress damage and deformation of the electronic component and can maintain sufficient reading performance, even in the case of traveling a tire having an electronic component provided therein under high speed and severe handling.

Means for Solving the Problem

The inventors of the present invention have earnestly studied for solving the problem, found that the problem can be solved by the invention described below, and completed the present invention.

The invention according to claim 1 is:
a pneumatic tire provided with an electronic component at a position outer side of the carcass in the tire axial direction,
wherein
$E^*(1)_{50°C.}$ at 50° C. and $E^*(1)_{150°C.}$ at 150° C. of the first rubber member having the largest $E^*(50°C.)$ at 50° C. among rubber members for a tire located inward in the tire axial direction from the position where the electronic component is provided, and
$E^*(2)_{50°C.}$ at 50° C. and $E^*(2)_{150°C.}$ at 150° C. of the second rubber member having the largest $E^*(50°C.)$ at 50° C. among rubber members for a tire located outward in the tire axial direction from the position where the electronic component is provided,
satisfy $E^*(1)_{50°C.}$ is larger $E^*(2)_{50°C.}$, and satisfy the following formula.

$$(E^*(1)_{50°C.}/E^*(2)_{50°C.})-(E^*(1)_{150°C.}/E^*(2)_{150°C.}) \geq 1.0.$$

The invention according to claim 2 is:
the pneumatic tire according to claim 1, wherein
$E^*(1)_{50°C.}$ at 50° C. and $E^*(1)_{150°C.}$ at 150° C. of the first rubber member and
$E^*(2)_{50°C.}$ at 50° C. and $E^*(2)_{150°C.}$ of at 150° C. of the second rubber member satisfy the following formula.

$$(E^*(1)_{50°C.}/E^*(2)_{50°C.})-(E^*(1)_{150°C.}/E^*(2)_{150°C.}) \geq 2.0.$$

The invention according to claim 3 is:
the pneumatic tire according to claim 2, wherein
$E^*(1)_{50°C.}$ at 50 and $E^*(1)_{150°C.}$ at 150° C. of the first rubber member and
$E^*(2)_{50°C.}$ at 50° C. and $E^*(2)_{150°C.}$ at 150° C. of the second rubber member satisfy the following formula.

$$(E^*(1)_{50°}/E^*(2)_{50°C.})-(E^*(1)_{150°C.}/E^*(2)_{150°C.}) \geq 3.0.$$

The invention according to claim 4 is:
the pneumatic tire according to claim 3, wherein
$E^*(1)_{50°C.}$ at 50° C. and $E^*(1)_{150°C.}$ or at 150° C. of the first rubber member and
$E^*(2)_{50°C.}$ at 50° C. and $E^*(2)_{150°C.}$ at 150° C. of the second rubber member satisfy the following formula.

$$(E^*(1)_{50°C.}/E^*(2)_{50°C.})-(E^*(1)_{150°C.}/E^*(2)_{150°C.}) \geq 4.0.$$

The invention according to claim 5 is:
the pneumatic tire according to claim 4, wherein
$E^*(1)_{50°C.}$ at 50° C. and $E^*(1)_{150°C.}$ at 150° C. of the first rubber member and
$E^*(2)_{50°C.}$ at 50° C. and $E^*(2)_{150°C.}$ at 150°C of the second rubber member satisfy the following formula.

$$(E^*(1)_{50°C.}/E^*(2)_{50°C.})-(E^*(1)_{150°C.}/E^*(2)_{150°C.}) \geq 5.0.$$

The invention according to claim 6 is:
the pneumatic tire according to any one of claims 1-5 wherein
the electronic component is located outer side of the carcass in the tire axial direction in the cross-sectional view, and is embedded at a position of 20 to 80% from the bottom of bead core with respect to the distance from the position of the maximum tire width to the bottom of bead core in the equatorial direction.

Effect of the Invention

According to the present invention, a manufacturing technology for a tire is provided which can manufacture a tire capable of suppressing damage and deformation of the electronic component and maintaining sufficient reading performance, even in the case of traveling a tire having an electronic component provided therein under high speed and severe handling.

EMBODIMENT FOR CARRYING OUT THE INVENTION

Hereinafter, the present invention will be described based on the embodiments.

[1] Background of the Present Invention

As a result of studies for solving the above-mentioned problems, the present inventors have thought that increase in internal temperature of tire is the cause of why the electronic component is damaged and deformed and sufficient reading performance cannot be obtained, when traveling is performed under high speed and severe handling.

That is, the internal temperature of tire is 50 to 70° C. in normal traveling, but, when performing traveling under high-speed and severe handling, the internal temperature of tire greatly rises to about 150° C. Then, the present inventors have considered that, when the temperature is greatly increased in this way, the deformation amount of the tire is increased accordingly, and the electronic component is subjected to a large impact, resulting in damage and deformation of the electronic component, and lowering the reading performance.

Therefore, the present inventors have studied the cause of the large deformation amount of the tire. As a result, it has been found that the change of the elastic modulus E* in the rubber members located inside and outside with the electronic component in the tire axial direction causes the occurrence of a large amount of deformation of the tire.

That is, various rubber members are disposed in a tire with an electronic component interposed therebetween. Among them, a rubber having large E*(hard) is used as the inner rubber member in consideration of steering stability, and a rubber having small E*(soft) is used as the outer rubber member in consideration of reducing the deformation of the tire which occurs during traveling.

During normal travelling, the amount of deformation of the tire is small, and only the rubber member located outwardly is slightly deformed, so that only the outer rubber member needs to be soft in order to reduce the impact on the electronic component. However, at the time of high speed and severe handling, the internal temperature of the tire largely rises to about 150° C. and the deformation amount of the tire becomes large, so both rubber members are deformed. At this time, if there is a large difference in E* between both rubber members as in the case of normal traveling, the difference in deformation between both rubber members becomes much larger than the difference at 50° C., and it has been found that the electronic component located at the boundaries is susceptible to deformation and damage under the influence.

Therefore, the present inventors have studied a specific means for reducing the difference in E* under high speed and severe handling, and have found that, when, among the rubber members located inside and outside in the tire axial direction with the electronic component, the rubber member having the largest E*(50° C.) at 50° C. among the rubber members for a tire located inward is regarded as the first rubber member, and the rubber member having the largest E*(50° C.) at 50° C. among the rubber members for a tire located outward is regarded as the second rubber member:

it is sufficient that $E^*(1)_{50°\ C.}$ at 50° C. and $E^*(1)_{150°\ C.}$ at 150° C. of the first rubber member, and $E^*(2)_{50°\ C.}$ at 50° C. and $E^*(2)_{150°\ C.}$ at 150° C. of the second rubber member satisfy $E^*(1)_{50°\ C.}$ is larger $E^*(2)_{50°\ C.}$ and satisfy the following formula.

$(E^*(1)_{50°\ C.}/E^*(2)_{50°\ C.}) - (E^*(1)_{150°\ C.}/E^*(2)_{150°\ C.}) \geq 1.0$.

It has been found further that the right side of above formula is preferably 2.0 or more, more preferably 3.0 or more, further preferably 4.0 or more, and particularly preferably 5.0 or more. Thus, the present invention has been completed.

As the elastic modulus ratio of both rubber members at 150° C. (is reduced, the value of the above formula, that is, the difference value between the elastic modulus ratio at 50° C. and the elastic modulus ratio at 150° C. becomes larger. By reducing the elastic modulus ratio at 150° C. so that the difference value becomes 1 or more, the impact at the periphery of the electronic component is mitigated, and damage and deformation of the electronic component can be suppressed.

There is no need to set the upper limit of the above formula in order to exert the effect of the present invention, but in view of easiness of manufacturing a tire, 8 or less is preferable, and 7 or less is more preferable.

In this case, E* in the above is the value measured under the conditions shown below using a visco-elastic spectrometer (for example, "VESF-3" manufactured by Iwamoto Seisakusho Ltd.) in accordance with the prescription of "JIS K 6394". In the present application, E* means an absolute value.

Initial strain: 10%
Amplitude: ±2.0%
Frequency: 10 Hz
Deformation mode: Tension
Measurement temperatures: 50° C. and 150° C.

[2] Embodiment of the Present Invention

1. Tire Configuration
(1) Overall Configuration

Figure 1:
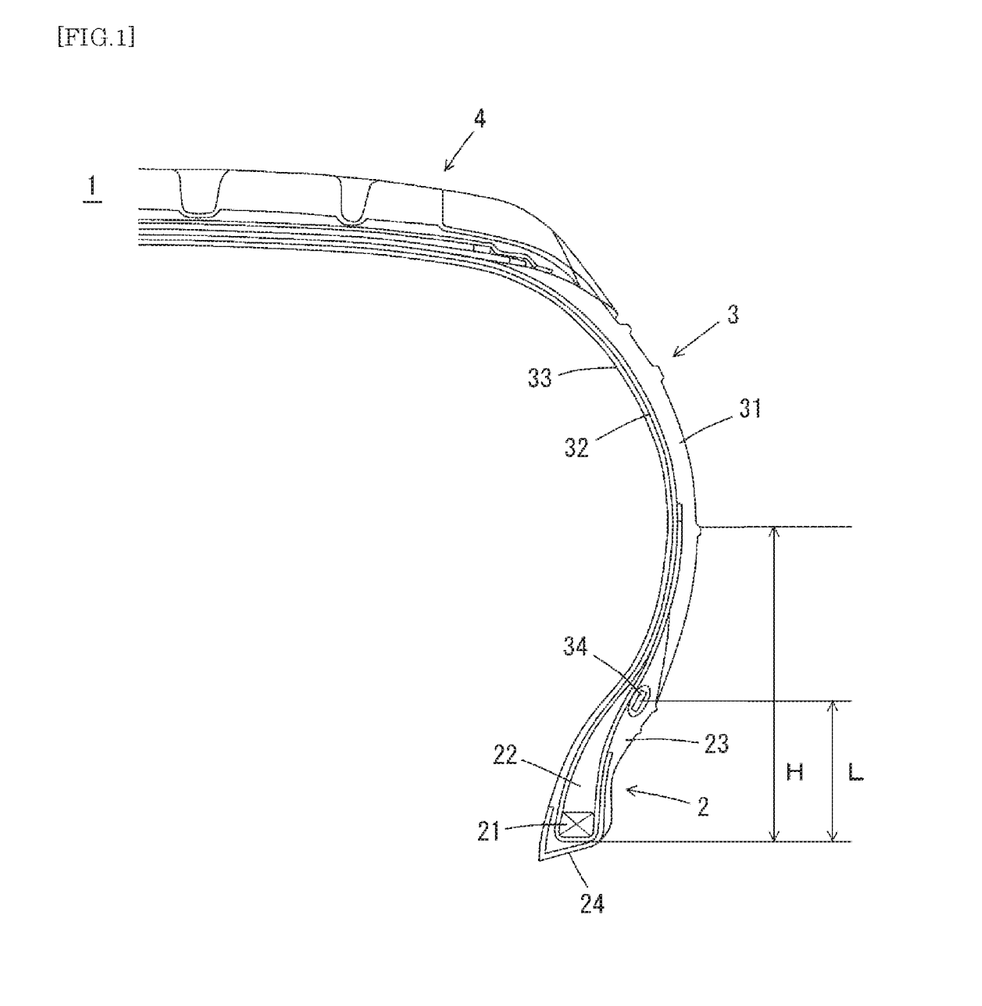
FIG. 1 This figure is a cross-sectional view showing a configuration of a pneumatic tire according to an embodiment of the present invention.

In the tire according to the present embodiment, a clinch is disposed as the second rubber member and bead apexes are disposed as the first rubber member, with the electronic component interposed therebetween. FIG. 1 is a cross-sectional view showing the configuration of a tire according to an embodiment of the present invention, and more specifically, a cross-sectional view of a tire of size 225/60R16.

In FIG. 1, 1 is a tire, 2 is a bead portion, 3 is a sidewall portion, 4 is a tread, 21 is a bead core. 22 is a bead apex, and 23 is a clinch member (hereinafter also referred to as "clinch"). In this case, the clinch is an external member located inner side of the sidewall in the tire radial direction, and located outer side of the bead apex in the tire axial direction. In addition. 24 is a chafer, 31 is a sidewall, 32 is a carcass, and 33 is an inner liner. Reference numeral 34 denotes an electronic component. In FIG. 1, H is the distance from the position of the maximum tire width to the bottom of bead core, and L is the distance of the electronic component 34 from the bottom of bead core.

(2) Clinch and Bead Apex

In the present embodiment, as described above, the clinch 23 is provided as the rubber member having the largest E*(50° C.) at 50° C. among rubber members for a tire located outward in the tire axial direction from the position where the electronic component is provided (the second rubber member). Incidentally, E*(50° C.) of the rubber composition for clinch is, for example, 10 to 30 MPa, and E*(150° C.) is, for example, 2.5 to 20 MPa.

Further, in the present embodiment, the bead apex 22 is provided as the rubber member having the largest E*(50° C.) at 50° C. among rubber members for a tire located inward in the tire axial direction from the position where the electronic component is provided (the first rubber member). Incidentally, E*(50° C.) of the rubber composition for bead apex is, for example, 10 to 140 MPa, and E*(150° C.) is, for example, 2.5 to 100 MPa.

In this case, regarding the E*(50° C.), E*(150° C.) of the rubber composition for clinch and E*(50° C.), E*(150° C.) of the rubber composition for bead apex, the ranges described above are merely exemplified from the respective points of view, and are not mutually restricted. For example, in the case of using the rubber composition for clinch of E*(50° C.) in the range exemplified above, E*(150° C.) of the rubber composition for clinch. E*(50° C.), E*(150° C.) of rubber composition for bead apex are not limited to the ranges exemplified above as far as the above formula is satisfied.

(3) Electronic Component

In the present embodiment, specific examples of the electronic components include RFID, pressure sensor, temperature sensor, acceleration sensor, magnetic sensor, groove depth sensor, and the like. Above all, RFID can store and read a large capacity of information without contact, so it can store manufacturing information for tire, management information, customer information, etc. in addition to data such as pressure and temperature. Therefore, it is particularly preferred.

And, the specific position where the electronic component 34 is to be provided is not particularly limited, as far as it is a place where reliable information communication is possible and the electronic component is not easily damaged due to the deformation of the tire. As the examples, between the bead portion and the clinch, between the bead portion and the sidewall, and between the bead reinforcing layer which is disposed outer side in the axial direction of the bead apex to suppress the deformation of the bead apex and the clinch, between the bead reinforcing layer and the sidewall, etc., can be mentioned.

However, as a position where the damage of the electronic component by the deformation of the tire is relatively small and communication from the outside can be made without problems when assembled in the rim, it is preferable to be a position, in the tire cross-sectional view, outer side of the carcass in tire axial direction where the height from the bottom of bead core (L in FIG. 1) is 20 to 80% with respect to the distance from the position of the maximum tire width to the bottom of bead core in the equatorial direction (H in FIG. 1).

The longitudinal size (overall length including the IC chip and the antenna) of the electronic component to be provided in a tire in the present embodiment is preferably 18 cm or less, more preferably 9 cm or less, further more preferably 4 cm or less, and most preferably 2 cm or less. There is a risk that the electronic components may be damaged or deformed due to the decrease in rigidity caused by the increase in internal temperature of the tire accompanying high speed and severe handling. However, in the present embodiment, the electronic component is not damaged or deformed even if the internal temperature of the tire rises, and the reading performance of parts can be maintained, since E* of the first rubber member and the second rubber member is appropriately controlled, as described above. At this time, bending of the antenna portion can be kept to a minimum by arranging the antenna portion of the electronic component to extend in an orthogonal direction to the cord of carcass.

(4) Rubber Composition for Clinch

The rubber composition used in the manufacture of clinch can be obtained by kneading and mixing a rubber component which is the main component and various compounding materials such as a reinforcing material, an anti-aging agent, an additive and the like.

(i) Rubber Component

As the rubber component, for example, diene rubbers such as natural rubber (NR), isoprene rubber (IR), butadiene rubber (BR), styrene butadiene rubber (SBR), acrylonitrile butadiene rubber (NBR), chloroprene rubber (CR), butyl rubber (IIR), and the like can be mentioned. Among them, isoprene-based rubber (NR and IR) and BR are preferable, and combination of isoprene-based rubber (NR and IR) and BR is more preferable because low fuel consumption and good durability can be obtained favorably.

Content of the isoprene-based rubber (NR or IR) is preferably 10 parts by mass or more, and more preferably 30 parts by mass or more with respect to 100 parts by mass of the rubber component. Moreover, it is preferably 80 parts by mass or less, and more preferably 50 parts by mass or less. By setting the content of isoprene-based rubber (NR and IR) in the rubber component within the above range, sufficient breaking elongation and sufficient bending crack growth resistance can be secured.

Content of BR is preferably 20 parts by mass or more, and more preferably 50 parts by mass or more with respect to 100 parts by mass of the rubber component. Moreover, it is preferably 90 parts by mass or less, and more preferably 70 parts by mass or less. By setting the content of BR in the rubber component within the above range, sufficient bending crack growth resistance and sufficient breaking strength can be secured.

In this case, the BR is not particularly limited. For example, BR having a high cis content, BR containing syndiotactic polybutadiene crystals (SPB-containing BR), modified BR and the like can be used. Among them, SPB-containing BR is preferable from the viewpoint that extrusion processability can be greatly improved by the intrinsic orientation crystal component.

In the combination of isoprene rubber (NR or IR) and BR, total content of isoprene rubber (NR or IR) and BR is preferably 80 parts by mass or more, and more preferably 90 parts by mass or more in 100 parts by mass of the rubber component. By setting the total content of isoprene-based rubber (NR and IR) and BR within the above range, sufficient low fuel consumption and sufficient durability can be secured.

(ii) Carbon Black

It is preferable that carbon black is compounded as a reinforcing material in the rubber composition of the present embodiment. Examples of carbon black include GPF, HAF, ISAF, SAF, FF, FEF and the like. One of these carbon blacks may be used alone, or two or more thereof may be used in combination. Among these, hard carbon-based ISAF, SAF, and HAF are preferable from the viewpoint of securing the hardness, and among them, HAF is particularly preferable.

Content of carbon black in the above rubber composition is preferably 50 parts by mass or more, and more preferably 60 parts by mass or more with respect to 100 parts by mass of the rubber component. Moreover, it is preferably 80 parts by mass or less, and more preferably 70 parts by mass or less. By setting the content of carbon black in the rubber composition within the above range, sufficient hardness can be obtained.

(iii) Vulcanizing Agent and Vulcanization Accelerator

Sulfur is used as a vulcanizing agent, and its content is preferably 1 part by mass or more, and more preferably 2 parts by mass or more with respect to 100 parts by mass of the rubber component. Moreover, it is preferably 8 parts by mass or less, and more preferably 6 parts by mass or less. By setting the content of sulfur within the above range, sufficient steering stability can be secured, bloom and adhesion of sulfur can be suppressed, and the durability can be secured. Content of sulfur is pure sulfur content, and when using insoluble sulfur, it is content except oil content.

Sulfur is usually used together with a vulcanization accelerator. Content of the vulcanization accelerator is preferably 2 parts by mass or more, and more preferably 5 parts by mass or more with respect to 100 parts by mass of the rubber component. Moreover, it is preferably 10 parts by mass or less, and more preferably 7 parts by mass or less. By setting the content of the vulcanization accelerator within the above range, the effects of the present invention tend to be favorably obtained. Specific examples of the vulcanization accelerators include sulfenamide type, thiazole type, thiuram type, thiourea type, guanidine type, dithiocarbamic acid type, aldehyde-amine type or aldehyde-ammonia type, imidazoline type, and xanthate type vulcanization accelerators. These vulcanization accelerators may be used alone or in combination of two or more. Among these, sulfenamide type vulcanization accelerators is preferable because the scorch time and the vulcanization time can be balanced.

(iv) Stearic Acid

As stearic acid, conventionally known products can be used. For example, products manufactured by NOF Corporation, Kao Corporation, Wako Pure Chemical Industries, Ltd., Chiba Fatty Acid Corporation, etc. can be used. When stearic acid is used, content of stearic acid is preferably 0.5 part by mass or more, and more preferably 1 part by mass or more with respect to 100 parts by mass of the rubber component. Moreover, it is preferably 10 parts by mass or less, and more preferably 5 parts by mass or less. By setting the content of stearic acid within the above range, the effects of the present invention tend to be obtained favorably.

(v) Zinc Oxide

As zinc oxide, conventionally known ones can be used. For example, products manufactured by Mitsui Mining & Smelting Co., Ltd., Toho Zinc Co., Ltd., Hakusui Tech Co., Ltd., Shodo Chemical Industry Co., Ltd., Sakai Chemical Industry Co., Ltd., etc. can be used. When using zinc oxide, content of zinc oxide is preferably 0.5 part by mass or more, and more preferably 1 part by mass or more with respect to 100 parts by mass of the rubber component. Moreover, it is preferably 10 parts by mass or less, and more preferably 5 parts by mass or less. By setting the content of zinc oxide within the above range, the effects of the present invention tend to be obtained favorably.

(vi) Anti-Aging Agent

As the anti-aging agent, an amine-type anti-aging agent having an excellent ozone resistance effect is preferable. The amine-type anti-aging agent is not particularly limited, and examples thereof include amine derivatives such as diphenylamine-type, p-phenylenediamine-type, naphthylamine-type and ketone amine condensate-type ones. These may be used alone, and two or more may be used in combination. Examples of diphenylamine type derivatives include p-(p-toluenesulfonylamide)-diphenylamine, octylated diphenylamine, 4,4'-bis ($\alpha,\alpha'$-dimethylbenzyl) diphenylamine and the like. Examples of p-phenylenediamine type derivatives include N-(1,3-dimethylbutyl)-N'-phenyl-p-phenylenediamine (6PPD), N-phenyl-N'-isopropyl-p-phenylenediamine (IPPD) and N, N'-di-2-naphthyl-p-phenylenediamine and the like. Examples of the naphthylamine type derivatives include phenyl-$\alpha$-naphthylamine and the like. Among them, phenylenediamine type and ketone amine condensate type are preferable. Content of the anti-aging agent is preferably 0.3 part by mass or more, and more preferably 1 part by mass or more with respect to 100 parts by mass of the rubber component. Moreover it is preferably 8 parts by mass or less, and more preferably 4 parts by mass or less.

(vii) Oil

Example of oils include process oils, vegetable oils and fats, and mixtures thereof. As the process oil, for example, paraffin-based process oil, aroma-based process oil, naphthene-based process oil and the like can be used. Example of vegetable fats and oils include castor oil, cottonseed oil, linseed oil, rapeseed oil, soybean oil, palm oil, coconut oil, peanut oil, rosin, pine oil, pine tar, tall oil, corn oil, rice oil, beni flower oil, sesame oil, olive oil, sunflower oil, palm kernel oil, camellia oil, jojoba oil, macadamia nut oil, tung oil and the like. These may be used alone or in combination of two or more. Specific examples of the oil which can be used include products manufactured by Idemitsu Kosan Co., Ltd., Sankyo Yuka Kogyo Co., Ltd., Japan Energy Co., Ltd., Orisoi Company, H & R Company, Toyokuni Oil Co., Ltd., Showa Shell Co., Ltd., Fuji Kosan Co., Ltd., etc. Content of oil is preferably 0.5 part by mass or more, and more preferably 1 part by mass or more with respect to 100 parts by mass of the rubber component. Moreover, it is preferably 10 parts by mass or less, and more preferably 5 parts by mass or less.

(viii) Others

In addition to the above components, the rubber composition of the present embodiment may also contain compounding materials conventionally used in the rubber industry. For example, inorganic fillers such as silica, talc and calcium carbonate, and organic fillers such as cellulose fibers, softeners such as liquid rubber and adhesive resins, vulcanizing agents other than sulfur, organic crosslinking agents and the like can be compounded as needed. The compounding quantity of each compounding material can be selected suitably.

In the present embodiment, as a method of adjusting $E^*$ of clinch, it is preferable to adjust with the amount of carbon black or sulfur. Thereby, without the need for excessive trial and error, the aimed $E^*$ can be achieved.

(5) Rubber Composition for Bead Apex

In this embodiment, as the rubber composition used in the manufacture of bead apex, the same materials as the rubber composition for clinch described above can be used. Further, each material shown below can also be used.

(i) Rubber Component

As a rubber component, basically the same rubber component as for clinch can be used, but combined use of isoprene rubber (NR or IR) and SBR is preferable because favorable low fuel consumption and durability can be obtained.

Content of the isoprene-based rubber (NR or IR) is preferably 60 parts by mass or more, and more preferably 65 parts by mass or more in 100 parts by mass of the rubber component. Moreover, it is preferably 90 parts by mass or less, and more preferably 85 parts by mass or less. By setting the content of isoprene-based rubber (NR or IR) in the rubber component as described above, sufficient breaking elongation and sufficient bending crack growth resistance can be secured.

Content of the SBR is preferably 10 parts by mass or more, and more preferably 15 parts by mass or more in 100 parts by mass of the rubber component. Moreover, it is preferably 40 parts by mass or less, and more preferably 35 parts by mass or less. By setting the content of SBR within the above described range, sufficient extrusion processability can be secured, and sufficient hardness and low fuel consumption can be secured.

SBR is not particularly limited, and for example, emulsion-polymerized styrene butadiene rubber (E-SBR), solution-polymerized styrene butadiene rubber (S-SBR) and the like can be used. Among them, E-SBR is preferable from the viewpoint that it can disperse carbon black well and its processability is good.

Styrene content in SBR is preferably 10 to 40 wt %, more preferably 20 to 30 wt %. By making styrene content within the above range, sufficient hardness and low fuel consumption can be secured.

(ii) Curable Resin and Curing Agent

In the present embodiment, it is preferable that a curable resin is compounded further for enhancing the rigidity. As the curable resin, a phenol-type resin can be mentioned although it is not specifically limited.

Specific examples of phenolic resins include phenolic resins and modified phenolic resins. Here, the phenolic resin is obtained by reacting phenol with an aldehyde such as formaldehyde, acetaldehyde, furfural or the like by an acid or an alkali catalyst. The modified phenolic resin is a phenolic resin modified with a compound such as cashew oil, tall oil, linseed oil, various animal and vegetable oils, unsaturated fatty acids, rosins, alkylbenzene resins, aniline or melamine.

As the phenol resin, a modified phenol resin is preferable from the viewpoint that a good hardness can be obtained by a curing reaction, and a cashew oil modified phenol resin and a rosin modified phenol resin are more preferable.

Content of the curable resin in the rubber composition is preferably 5 parts by mass or more, and more preferably 10 parts by mass or more with respect to 100 parts by mass of the rubber component. Moreover, it is preferably 25 parts by mass or less, and more preferably 20 parts by mass or less. By setting the content of the curable resin within the above range, sufficient rigidity and steering stability can be secured. In addition, the heat generation is reduced and rolling resistance is also reduced.

In the case of compounding a phenolic resin as a curable resin, it is preferable to further contain a curing agent having a curing action with the phenolic resin. Specific curing agent is not particularly limited as far as it has the above-mentioned curing action, and, for example, hexamethylenetetramine (HMT), hexamethoxymethylolmelamine (HMMM), hexamethoxymethylolpentamethylether (HMMPME), melamine, methylolmelamine and the like can be mentioned. Among them, HMT, HMMM, and HMMPME are preferable from the viewpoint of being excellent in the action of increasing the hardness of the phenolic resin.

Content of the curing agent is preferably 0.4 part by mass or more, and more preferably 0.5 part by mass or more with respect to 100 parts by mass of the phenolic resin. Moreover, it is preferably 3.5 parts by mass or less, and more preferably 2.5 parts by mass or less. By setting the content of the curing agent within the above range, the curing reaction can be sufficiently advanced, and the excessive progress of the curing reaction can be suppressed.

(iii) Vulcanization Aid

In the present embodiment, it is preferable to contain 4 to 6 parts by mass of an alkylphenol-sulfur chloride condensate as a vulcanization aid in combination with sulfur which is a vulcanizing agent.

In the present embodiment, as a method for adjusting the $E^*$ of the bead apex, adjustment by increasing or decreasing the amount of a curable resin can be mentioned. As shown in the examples described later, $E^*$ can be increased by increasing the amount of curable resin. $E^*$ can also be adjusted by increasing or decreasing the amount of carbon black or sulfur. As shown in the examples described later, $E^*$ can be increased by increasing the amount of carbon black or sulfur. However, when the amount of carbon black is increased, the heat generation increases, and when the amount of sulfur is increased, the heat generation decreases. Therefore, it is preferable to adopt a means in which use of the curable resin and use amount of it are determined first, then the sulfur content is adjusted, thereafter the amount of carbon black is adjusted finally. Thereby, without the need for excessive trial and error, the aimed $E^*$ can be achieved.

(6) Manufacturing Method of Rubber Composition

The rubber composition of the clinch and of the bead apex can be manufactured by a known method, for example, by a method of kneading the above-mentioned components using a rubber kneading apparatus such as an open roll or a banbury mixer.

2. Manufacture of Tire

The tire according to the present embodiment can be manufactured by a usual method except for disposing the electronic component in the rubber member in the middle of molding. That is, the clinch and the bead apex are molded by extrusion processing according to each of the shapes of clinch and bead apex at the unvulcanized stage of the rubber composition, pasted together with the other tire members on a tire forming machine according to a usual method, and an unvulcanized tire is formed. In the middle of molding, the electronic component is embedded at a predetermined position between the clinch and the bead apex.

Thereafter, the unvulcanized tire in which the electronic component is disposed is heated and pressed in a vulcanizer to manufacture a tire.

EXAMPLES

1. Compounding Materials and Formulation

Table 1 shows the compounding materials. Table 2 shows the formulation.

TABLE 1

| Compounding materials | Product Name | Manufacturer |
|---|---|---|
| (Rubber component) | | |
| NR | TSR20 | |
| SBR | SBR1502 | Sumitomo Clemical Co., Ltd, |
| BR | UBEPOL BR 150B | Ube Industries, Ltd. |
| (Reinforcing material) | | |
| Carbon Black 1 | N550 | Showa Cabot Co., Ltd. |
| Carbon Black 2 | N330 | Showa Cabot Co., Ltd. |
| (Curable resin-Curing agent) | | |
| Curable resin | PR 12686 | Sumitomo Bakelite Co., Ltd. |
| Curing agent | SANCELER HMT | Sanshin Chemical Industry Co., Ltd. |
| (Softener) | | |
| Oil | Diana Process AH-24 | Idemitsu Kosan Co., Ltd |
| (Anti-aging agent) | | |
| Anti-aging agent | NOCLAC 6C | Ouchi Shinko Chemical Co., Ltd. |
| (Vulcanizing agent) | | |
| Sulfur | Insoluble Sulfur | Tsurumi Chemical Industry Co., Ltd. |
| Vulcanizing aid | Tacquiroll V-200 | Taoka Chemical Co., Ltd. |
| Vulcanization accelerator | SANCELER NS-G | Sanshin Chemical Industry Co., Ltd. |
| (Others) | | |
| Stearic acid | Tsubaki | NOF CORPORATION |
| Zinc oxide | Zinc Flower #1 | Mitsui Mining & Smelting Co., Ltd. |

TABLE 2

| | Formulation | | | | |
|---|---|---|---|---|---|
| | 1 | 2 | 3 | 4 | 5 |
| NR | 40 | 70 | 70 | 80 | 40 |
| SBR | — | 30 | 30 | 20 | 30 |
| BR | 60 | — | — | — | 30 |
| Carbon Black 1 | 70 | 70 | 60 | 70 | — |
| Carbon Black 2 | — | — | — | — | 50 |
| Curable resin | — | 5 | 10 | 18 | — |
| Oil | 10 | 10 | 5 | 5 | 5 |
| Anti-aging agent | 3 | — | — | — | 2 |
| Stearic acid | 3 | 2 | 2 | 2 | 3 |
| Zinc oxide | 2 | 3 | 3 | 8 | 5 |
| Sulfur | 2.5 | 2.5 | 2.5 | 6.0 | 5.0 |
| Vulcanizing aid | — | — | — | 1.0 | 5.0 |
| Vulcanization accelerator | 3.0 | 2.0 | 2.5 | 3.0 | 2.0 |
| Curing agent | — | 0.5 | 1.0 | 2.5 | — |

TABLE 3

| | Formulation | | | | |
|---|---|---|---|---|---|
| | 6 | 7 | 8 | 9 | 10 |
| NR | 70 | 80 | 80 | 80 | 80 |
| SBR | 30 | 20 | 20 | 20 | 20 |
| BR | — | — | — | — | — |
| Carbon Black 1 | 60 | 60 | 60 | 60 | 80 |
| Carbon Black 2 | — | — | — | — | — |
| Curable resin | 8 | 18 | 25 | 25 | 30 |
| Oil | 5 | 5 | 5 | 5 | 5 |
| Anti-aging agent | — | — | — | — | — |
| Stearic acid | 2 | 2 | 2 | 2 | 2 |
| Zinc oxide | 3 | 8 | 8 | 8 | 8 |
| Sulfur | 2.5 | 6 | 6 | 2.5 | 2.5 |
| Vulcanizing aid | — | 1 | 1 | 1 | 1 |
| Vulcanization accelerator | 2.5 | 3 | 3 | 2.5 | 2.5 |
| Curing agent | 0.8 | 2.5 | 2.5 | 1 | 1 |

2. Preparation of Pneumatic Tire

Based on the formulations in Table 1, Table 2 and Table 3, using a banbury mixer manufactured by Kobe Steel, Ltd., compounding materials other than sulfur and a vulcanization accelerator are kneaded, then sulfur and vulcanization acceleration are added to the kneaded product thus obtained, followed by kneading using an open roll, and a composition for clinch and an unvulcanized rubber composition for bead apex can be obtained. Moreover, according to Example 1 in JP2013-245339A, the rubber composition for coating the electronic component 34 can be obtained.

Then, the obtained unvulcanized rubber composition is formed into the shape of clinch or bead apex, then pasted together by laminating with other tire components in a tire molding machine, and an electronic component 34 coated with the unvulcanized rubber composition is provided at a position shown in FIG. 1 (a position 40% from the bottom of bead core). Thereafter, a vulcanization is conducted for 30 minutes at 150° C. and a test tire (tire size: 225/60R16) can be obtained. As the electronic component 34, an RFID in which a 30 mm antenna is provided on each of both sides of a 3 mm×3 mm×0.4 mm IC chip can be used.

The physical properties (E*) in each of the formulations shown in Table 2 and Table 3 above are measured according to the following method.

That is, a rubber sample is extracted from each clinch member and bead apex of each pneumatic tire, and a viscoelastic spectrometer ("VESF-3" manufactured by Iwamoto Seisakusho) is used to measure E* under the following conditions.

Initial strain: 10%

Amplitude: ±2.0%

Frequency: 10 Hz

Deformation mode: Tension

Measurement temperature: 50° C. and 150° C.

Table 4 and Table 5 show the relationship between the composition and physical properties of clinch and bead apex, the position of the electronic component, the durability of the tire, and the communication performance of the electronic component.

TABLE 4

| Examples/Comparative examples | Example 1 | Example 2 | Example 3 | Comparative example 1 |
|---|---|---|---|---|
| Formulation clinch (the second rubber member) | 1 | 1 | 1 | 1 |
| bead apex (the first rubber member) | 2 | 3 | 4 | 5 |
| $E^*(1)_{50°C.}$ | 37.5 | 101 | 122 | 17.1 |
| $E^*(2)_{50°C.}$ | 13.5 | 13.5 | 13.5 | 13.5 |
| A: $E^*(1)_{50°C.}/E^*(2)_{50°C.}$ | 2.78 | 7.48 | 9.04 | 1.27 |
| $E^*(1)_{150°C.}$ | 18.6 | 46.0 | 42.0 | 5.2 |
| $E^*(2)_{150°C.}$ | 10.5 | 10.5 | 10.5 | 10.5 |
| B: $E^*(1)_{150°C.}/E^*(2)_{150°C.}$ | 1.77 | 4.38 | 4.00 | 0.50 |
| A − B | 1.01 | 3.10 | 5.04 | 0.77 |
| durability of tire | Y | Y | Y | 7 |
| communication performance of electronic component | Y | G | EX | NG |

TABLE 5

| Examples/Comparative examples | Example 4 | Example 5 | Example 6 | Example 7 | Example 8 |
|---|---|---|---|---|---|
| Formulation clinch (the second rubber member) | 1 | 1 | 1 | 1 | 1 |
| bead apex (the first rubber member) | 6 | 7 | 8 | 9 | 10 |
| $E^*(1)_{50°C.}$ | 80 | 110 | 135 | 125 | 150 |
| $E^*(2)_{50°C.}$ | 13.5 | 13.5 | 13.5 | 13.5 | 13.5 |
| A: $E^*(1)_{50°C.}/E^*(2)_{50°C.}$ | 5.93 | 8.15 | 10.00 | 9.26 | 11.11 |
| $E^*(1)_{150°C.}$ | 36.8 | 44.0 | 40.5 | 25.0 | 33.0 |
| $E^*(2)_{150°C.}$ | 10.5 | 10.5 | 10.5 | 10.5 | 10.5 |
| B: $E^*(1)_{150°C.}/E^*(2)_{150°C.}$ | 3.50 | 4.19 | 3.86 | 2.38 | 3.14 |
| A − B | 2.43 | 3.96 | 6.14 | 6.88 | 7.97 |
| durability of tire | Y | Y | Y | Y | Y |
| communication performance of electronic component | G | EX | EX | EX | EX |

For the evaluation of the durability of tire shown above, a test to run around the circuit 5 laps at a high speed driving with raising the speed until reaching the limit grip is conducted. If 5 laps run is possible, evaluation result is "Y" (acceptable), and if not possible, evaluation result is "NG" (not acceptable). Regarding the driving conditions, the mounting rim is 15×6.5 J, the tire internal pressure is 230 kPa, the test vehicle is a front wheel drive vehicle, the displacement is 2000 cc, and the tire mounting position is all wheels.

Figure 2:
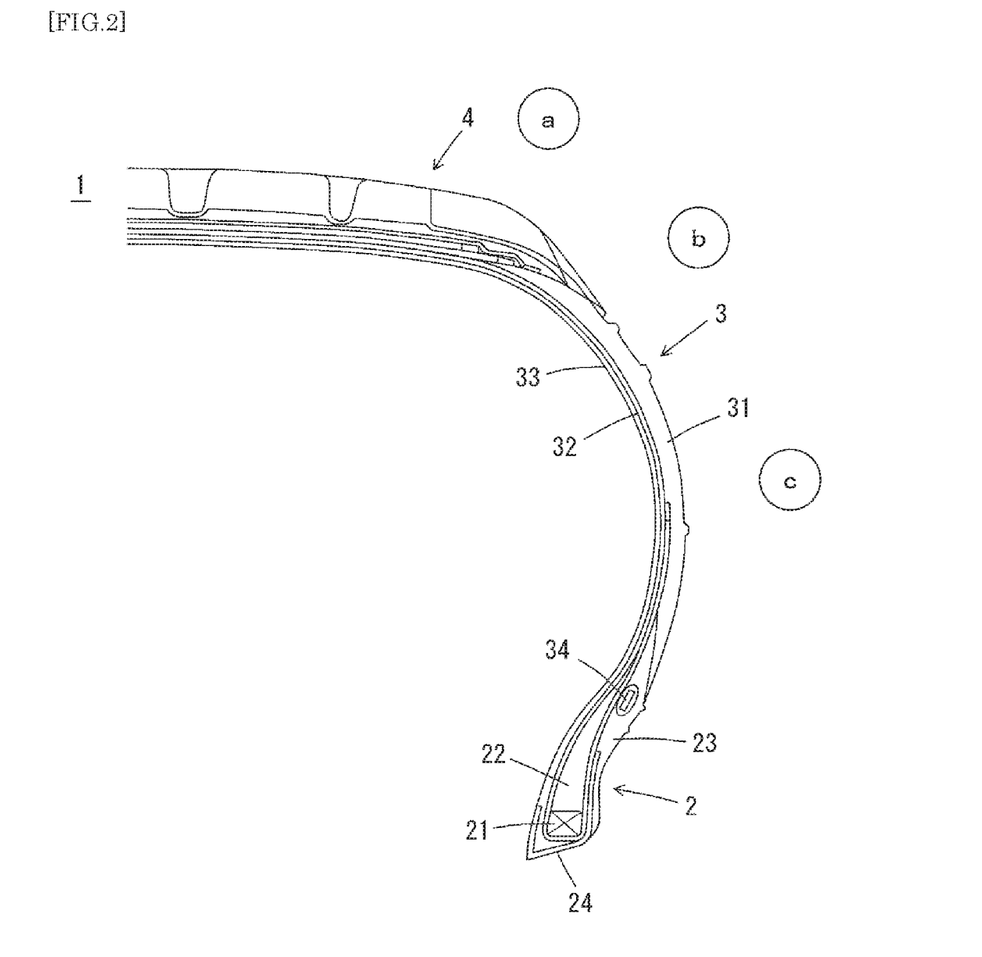
FIG. 2 It is a figure explaining the communication measurement points in the Examples of the present invention.

The evaluation method of communication property is a method where transceivers for the electronic component are installed at three measurement points (a to c) of the circle shown in FIG. 2 and it is judged whether communication of data with the electronic component is possible. Specifically, the tire is assembled in a rim and mounted in a vehicle for conducting the measurement, and the ratio of (the number of readable positions after the durability evaluation/the number of readable positions before the durability evaluation) is calculated. The evaluation result is "EX" (excellent), if the average value of the four tires is 60% or more; "G" (good), if 50% or more and less than 60%; "Y" (acceptable), if more than 0% and less than 50%: and "NG" (not acceptable), if 0% or readable position before durability evaluation is 0.

Although the present invention has been explained based on embodiments, the present invention is not limited to the above-mentioned embodiments. Various modifications can be made to the above embodiments within the same and equivalent scope of the present invention.

DESCRIPTION OF THE REFERENCE SIGNS 1 tire
2 bead portion
3 sidewall portion
4 tread
21 bead core
22 bead apex
23 clinch
24 chafer
31 sidewall
32 carcass
33 inner liner
34 electronic component
H Distance from the position of the maximum tire width to the bottom of bead core
L Distance from bottom of bead core of electronic component

What is claimed is:

1. A pneumatic tire provided with an electronic component at a position outside of a carcass in a tire axial direction, wherein:
   $E^*(1)_{50°C.}$ at 50° C. and $E^*(1)_{150°C.}$ at 150° C. of a first rubber member having a largest $E^*(50°$ C.) at 50° C. among rubber members for the tire located inward in the tire axial direction from a position where the electronic component is provided, and
   $E^*(2)_{50°C.}$ at 50° C. and $E^*(2)_{150°C.}$ at 150° C. of a second rubber member having a largest $E^*(50°$ C.) at 50° C. among rubber members for the tire located outward in the tire axial direction from a position where the electronic component is provided, $E^*(1)_{50°\,C.}$ is larger than $E^*(2)_{50°\,C.}$, and satisfy the following formula:

$$(E^*(1)_{50°\,C.}/E^*(2)_{50°\,C.}) - (E^*(1)_{150°\,C.}/E^*(2)_{150°\,C.}) \geq 1.0.$$

2. The pneumatic tire according to claim 1, wherein $E^*(1)_{50°\,C.}$ at 50° C. and $E^*(1)_{150°\,C.}$ at 150° C. of the first rubber member and $E^*(2)_{50°\,C.}$ at 50° C. and $E^*(2)_{150°\,C.}$ at 150° C. of the second rubber member satisfy the following formula:

$$(E^*(1)_{50°\,C.}/E^*(2)_{50°\,C.}) - (E^*(1)_{150°\,C.}/E^*(2)_{150°\,C.}) \geq 2.0.$$

3. The pneumatic tire according to claim 2, wherein $E^*(1)_{50°\,C.}$ at 50° C. and $E^*(1)_{150°\,C.}$ at 150° C. of the first rubber member and $E^*(2)_{50°\,C.}$ at 50° C. and $E^*(2)_{150°\,C.}$ at 150° C. of the second rubber member satisfy the following formula:

$$(E^*(1)_{50°\,C.}/E^*(2)_{50°\,C.}) - (E^*(1)_{150°\,C.}/E^*(2)_{150°\,C.}) \geq 3.0.$$

4. The pneumatic tire according to claim 3, wherein $E^*(1)50°$ C. at 50° C. and $E^*(1)150°$ C. at 150° C. of the first rubber member and $E^*(2)50°$ C. at 50° C. and $E^*(2)150°$ C. at 150° C. of the second rubber member satisfy the following formula:

$$(E^*(1)_{50°\,C.}/E^*(2)_{50°\,C.}) - (E^*(1)_{150°\,C.}/E^*(2)_{150°\,C.}) \geq 4.0.$$

5. The pneumatic tire according to claim 4, wherein $E^*(1)50°$ C. at 50° C. and $E^*(1)150°$ C. at 150° C. of the first rubber member and $E^*(2)50°$ C. at 50° C. and $E^*(2)150°$ C. at 150° C. of the second rubber member satisfy the following formula:

$$(E^*(1)_{50°\,C.}/E^*(2)_{50°\,C.}) - (E^*(1)_{150°\,C.}/E^*(2)_{150°\,C.}) \geq 5.0.$$

6. The pneumatic tire according to claim 1, wherein $E^*(1)50°$ C. at 50° C. and $E^*(1)150°$ C. at 150° C. of the first rubber member and $E^*(2)50°$ C. at 50° C. and $E^*(2)150°$ C. at 150° C. of the second rubber member satisfy the following formula:

$$(E^*(1)_{50°\,C.}/E^*(2)_{50°\,C.}) - (E^*(1)_{150°\,C.}/E^*(2)_{150°\,C.}) \geq 8.$$

7. The pneumatic tire according to claim 6, wherein $E^*(1)_{50°\,C.}$ at 50° C. and $E^*(1)_{150°\,C.}$ at 150° C. of the first rubber member and $E^*(2)_{50°\,C.}$ at 50° C. and $E^*(2)_{150°\,C.}$ at 150° C. of the second rubber member satisfy the following formula:

$$(E^*(1)_{50°\,C.}/E^*(2)_{50°\,C.}) - (E^*(1)_{150°\,C.}/E^*(2)_{150°\,C.}) \geq 7.$$

8. The pneumatic tire according to claim 1, wherein the electronic component is located outer side of the carcass in the tire axial direction in the cross-sectional view, and is embedded at a position of 20 to 80% from the bottom of bead core with respect to the distance from the position of the maximum tire width to the bottom of bead core in the equatorial direction.

9. The pneumatic tire according to claim 1, wherein the electronic component is a RFID.

* * * * *